UNITED STATES PATENT OFFICE.

AUGUST E. SCHUTTE, OF NORTHBORO, MASSACHUSETTS.

HYDRAULIC CONCRETE STRUCTURE.

1,331,217.   Specification of Letters Patent.   Patented Feb. 17, 1920.

No Drawing.   Application filed January 2, 1920. Serial No. 349,078.

*To all whom it may concern:*

Be it known that I, AUGUST E. SCHUTTE, a citizen of the United States, residing at Northboro, county of Worcester, in the State of Massachusetts, post-office address Northboro, Massachusetts, have invented a new and useful Improvement in Hydraulic Concrete Structures, of which the following is a specification.

The present application is in part a continuation of my copending application 318,032, filed August 16, 1919.

My composition consists of the following ingredients: Portland cement (with or without mineral aggregate) water, bituminous cement (asphalt or other semi-viscous bitumen). These ingredients are thoroughly mingled while hot by agitation in any form of a mixer. Heat can be applied either directly or indirectly to the mixer. Bituminous cement is added to the mixture containing the Portland cement preferably while the former is in a heated and liquid form, the object being to keep the bituminous cement liquid in the mixture during the mixing process. The composition is applied upon the surface whch is to support it.

My composition thus produced has an advantage over bituminous compositions and also an advantage over cement compositions because after having set it cannot be liquefied by the application of heat, but will retain its form even when heated to temperatures as high as 300° F. or more. The Portland cement and water composing the structure "sets" while the bituminous cement hardens in the structure among the crystals produced by the setting of the Portland cement, thus making a mass having a hard bituminous cement inclosed in its pores. If such a composition after setting is treated with solvent agents such as carbon bisulfid, carbon tetrachlorid, chloroform, ether, benzol, etc., and the bituminous portion dissolved and extracted out of it, then a porous Portland cement structure will remain.

One of the main characteristics and the one of inestimable value, is the fact, that my hot mixture of Portland cement, bituminous cement and water, with or without the addition of mineral aggregate, will firmly adhere to either an old or new Portland cement structure.

Some attempts have heretofore been made to produce structures of Portland cement and bituminous oils, but in all these cases the oil surrounds the particles of the cement and a weak structure is produced; the oil gradually evaporates and leaves the Portland cement structure in a porous and weak state.

One of the principal uses for this composition would be in the construction of roadways and pavements. It is a well known fact that pavements composed of Portland cement mixtures have not all of the desirable qualities necessary in a good roadway. They are not water proof and quickly dust up, crack and wear. Many attempts have been made to cover such surfaces with bituminous cement or other bituminous mixture, but such surface applications do not adhere and are soon worn away in spots and patches.

My composition, however, having the peculiar characteristic, when applied hot, of firmly and securely adhering to hard surfaces, especially to Portland cement surfaces, thus forms a most excellent layer to be applied upon Portland cement road surfaces or Portland cement foundations to make them waterproof and wear-resistant. The wear-resisting quality in the combination resides in the bituminous cement which is held in the pores of the structure formed by the set Portland cement. The advantages of this composition for waterproofing purposes are obvious for the above reasons. A mixture could be made containing a large amount of bituminous cement which would be absolutely waterproof even in a thin layer, and which would positively adhere to the concrete (old or new).

My composition could also be used with great advantage to prevent the action of sea water on Portland cement, as it can be applied in thin layers to almost any structure whether wet or dry.

Its uses are too many to be mention, new uses develop every day, and I do not confine myself to any specific use of my composition.

Since the largest use of this composition will probably be in the construction of Portland cement roadways, or for the re-surfacing of old cement roadways or structures, I will describe the method of constructing such roadway surfaces.

Upon a previously graded foundation there is spread a layer of suitable thickness (say, from four to six inches) of ordinary Portland cement concrete, composed in the proportions of, say 1—cement to 3—sand to 6—broken stone, and while this layer is still soft and plastic, or any time during or after its setting, there is then applied a layer of my composition of any desired thickness. This composition is a mixture of Portland cement and water, with or without any other mineral aggregate or material, to which is added a bituminous cement, such as asphalt cement, such mixture being applied after it has been rendered homogeneous by mixing. The mixture is preferably laid hot, and upon cooling two actions take place, first the hardening of the asphalt cement which takes place immediately upon cooling, and the second, the hardening or crystallization of the Portland cement, which is slow and extends over a number of days, or longer.

The composition may also be laid cold, in some cases, but always before the setting of the Portland cement. The result is a Portland cement structure having minute, almost microscopic cells, said cells filled with the asphalt cement; thus the composition devised by me has two distinct advantages, neither of them can be found either in any previously described structure of Portland cement or in any previously described structure having a bituminous cement as its cementing medium. This fact can easily be recognized by the phenomenon displayed by my structure upon application of heat. After my structure has "set," if heated, it will not collapse or lose shape, as, for instance, a bituminous mixture would; if a piece of sheet asphalt mixture is heated to a temperature of say 200 to 250° F. the structure will collapse and will become a plastic and easily displaceable mass, resembling that much sand. If, however, my composition is exposed to the same heat, or even to greater heat, the only result noticeable is the oozing out or "frying" out of its pores of the asphalt cement, while the structure itself will retain its shape, being a porous network of set Portland cement, unaffected by heat. If the asphalt or bituminous cement is removed by means of solvents, the hydraulic cement structure will remain.

My structure differs from the Portland cement structure by being waterproof, wear-resisting and somewhat resilient. It is not as hard as Portland cement structures and does not chip or wear away as readily. When applied as described above, my composition will adhere firmly to the Portland cement foundation and become part of it, without chipping off, thus being capable of being laid in very thin layers.

The mixing of my composition can be accomplished in a number of different ways, and I do not confine myself to any particular way of mixing. The preferred method of producing the mixture is as follows:

The Portland cement and water can be placed in a mixer and agitated while being heated, until it reaches a temperature of about 200° F., whereupon the bituminous cement is added, preferably in a hot and liquid state and the agitation continued until the mixture is a uniform and thoroughly homogeneous mass.

In another method of producing the mixture, the bituminous cement can be added cold to the Portland cement and water mixture (with sand, etc., if desired) and then the entire mixture agitated while being heated, until the bituminous cement becomes melted and incorporated with the other ingredients.

Another way would be to put all of the materials, including the water, into a mixer (cold), which is then heated directly or indirectly by steam or other heating agent while being agitated.

Again, one or more of the ingredients can be heated to a temperature high enough to impart enough heat to the other ingredients, which then can be added cold, to make the entire mass thoroughly miscible.

Still another way in which the mixture could be mixed *in situ* and applied is by spraying or blowing the ingredients (at least some of them being hot) and allowing them to become mixed either in transit or immediately upon reaching the surface which is intended to hold it.

The main object in all cases is to produce a homogeneous mass containing Portland cement and water and also containing intimately associated therewith minute particles of molten asphaltic cement, it being understood that Portland cement particles must be saturated or surrounded by water without being in intimate contact first with asphalt. The entire mixture must be hot at some stage of the treatment before being applied to the surfaces which are intended to be coated therewith and is preferably laid while hot. Of course, the mixture should be laid before the Portland cement therein has set.

For roadways, a mixture of about 10–30 per cent. of asphalt to 90–70 per cent. of hydraulic cement, by weight, can be used, while for waterproofing about 20–25% of the asphaltic cement is preferable, depending somewhat on the nature of the asphaltic or bituminous cement. For repair of concrete structures, for which this composition is particularly suitable, on account of its ability to adhere firmly to old concrete structures, the amount of bituminous cement can be reduced as low as 1–2%. For the protection of cement structures that are exposed to the action of sea water, about 10% gives good results, while for sewer pipes or similar structures also 10% should be used.

It is obvious that I cannot confine myself to any definite proportions, as in cases where waterproofing is the prime intent, a mixture containing more bituminous cement will be necessary, while for a structure where toughness and resistance to pressure and wear is required, less bitumen will be necessary. The proportions of the bituminous or asphaltic cement intermixed with the Portland cement and water will depend upon the purpose for which the composition is to be used and must therefore, be varied.

In all my compositions there is a fine structure of Portland cement having inclosed in its minute cells and pores a relatively hard bituminous cement, which at ordinary temperatures, is firmly held by the structure and which in its turn supports the filaments of the structure and prevents them from collapsing. In my composition there is a double action of the ingredients, the Portland cement producing the cellular structures upon hardening, while the bituminous cement fills the cells and toughens and waterproofs the structure.

In this specification, the expression "Portland cement" is, as is general in this art, intended to cover hydraulic cement generally.

I claim:

1. A body which comprises a cellular structure containing substantially hydrated Portland cement material, having its cells filled with a solidified bituminous cement.

2. A wear-resisting and waterproof structure composed of set hydraulic cement, having its cells filled with a bituminous cement.

3. A cellular structure comprising "set" Portland cement having its cells filled with a bituminous cement which is substantially solid when cold.

4. A waterproof wearing surface structure comprising a layer of hardened Portland cement, toughened and made wear-resisting by having its pores filled with a bituminous cement.

5. A rigid, wear-resisting body comprising toughening and wear-resisting particles, of a bituminous character, dispersed throughout a rigid mass of Portland cement.

6. A method of producing a waterproof structure which comprises adding to a mixture of Portland cement and water, a bituminous cement, liquefied by heating, intimately mixing the mass hot, and applying the same upon a surface which is to support it.

7. A process which comprises mixing a hydraulic cement and water while hot with a bituminous cement, and applying such mixture to a foundation.

8. A process which comprises mixing a hydraulic cement and water while hot with a bituminous cement, and applying such mixture while hot to a foundation.

9. A method of producing a cellular bitumen-filled structure for the purpose described, by mixing a Portland-cement-and-water mixture with a hot molten bituminous cement, shaping the composition and allowing the same to "set."

In testimony whereof I hereunto affix my signature in the presence of two witnesses.

AUGUST E. SCHUTTE. [L. S.]

Witnesses:
ANNA E. WALSH,
ROBERT FOWLER.